(12) United States Patent
Charania et al.

(10) Patent No.: US 10,136,182 B2
(45) Date of Patent: Nov. 20, 2018

(54) PRESENTING MULTIMEDIA CONTENT FROM MULTIPLE SOURCES AT A SAME TIME

(71) Applicants: Cellco Partnership, Arlington, VA (US); Verizon Patent and Licensing Inc., Arlington, VA (US)

(72) Inventors: Rahim A. Charania, Euless, TX (US); Bradley D. Beaver, Richardson, TX (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 268 days.

(21) Appl. No.: 14/279,809

(22) Filed: May 16, 2014

(65) Prior Publication Data
US 2015/0334442 A1    Nov. 19, 2015

(51) Int. Cl.
| | |
|---|---|
| H04N 21/81 | (2011.01) |
| H04N 21/439 | (2011.01) |
| H04N 21/426 | (2011.01) |
| H04N 21/482 | (2011.01) |
| H04N 21/485 | (2011.01) |
| H04N 21/433 | (2011.01) |
| H04N 21/434 | (2011.01) |

(52) U.S. Cl.
CPC ....... *H04N 21/439* (2013.01); *H04N 21/4263* (2013.01); *H04N 21/4334* (2013.01); *H04N 21/4341* (2013.01); *H04N 21/4821* (2013.01); *H04N 21/4852* (2013.01)

(58) Field of Classification Search
CPC ............ H04N 21/439; H04N 21/4263; H04N 21/4821; H04N 21/4852; H04N 21/4341; H04N 21/4334
See application file for complete search history.

(56) References Cited

U.S. PATENT DOCUMENTS

| | | | |
|---|---|---|---|
| 2003/0210796 A1* | 11/2003 | McCarty et al. | ............... 381/81 |
| 2004/0133430 A1* | 7/2004 | Tsuchiuchi | ............... H04R 5/02 704/278 |
| 2011/0067048 A1* | 3/2011 | Barton et al. | ................... 725/28 |
| 2013/0050578 A1* | 2/2013 | Choi | ............................ 348/565 |
| 2013/0298160 A1* | 11/2013 | Grannan et al. | ................ 725/40 |

OTHER PUBLICATIONS

Wikipedia, "Set-top box", http://en.wikipedia.org/wiki/Set-top_box, Mar. 28, 2014, 7 pages.

* cited by examiner

*Primary Examiner* — Yassin Alata

(57) ABSTRACT

A device is configured to tune multiple tuners to multiple television channels. The device may receive image data and audio data for the television channels from the tuners. The device may provide the image data from the tuners for display on a display device and for display at a same time. The device may assign the audio data from a group of the tuners to respective audio channels. The device may provide the audio data from the group of tuners for output at the same time via the respective audio channels.

20 Claims, 9 Drawing Sheets

PRESENTING MULTIMEDIA CONTENT FROM MULTIPLE SOURCES AT A SAME TIME

BACKGROUND

Set-top boxes may be used in cable television (TV) systems, satellite TV systems, or other systems. Set-top boxes may include one or more tuners that each tune a source signal (e.g., a TV channel) into multimedia content. A set-top box may use multiple tuners to record multiple TV programs at the same time, or record a TV program at the same time a user watches another TV program.

DETAILED DESCRIPTION OF PREFERRED EMBODIMENTS

The following detailed description of example implementations refers to the accompanying drawings. The same reference numbers in different drawings may identify the same or similar elements.

Even though a set-top box may include multiple tuners, the set-top box may not provide multimedia content (e.g., audio data and/or image data) from multiple TV channels to a display device and/or speakers at the same time. In other words, a user may only be able to watch one TV channel at a time regardless of how many tuners the set-box includes. However, a user may find it useful to be able to watch and listen to multiple TV channels at the same time.

Implementations described herein may allow a user to view image data received from multiple tuners at a same time. For example, a set-top box may provide video for multiple TV programs, received through different tuners, for display on a display device at the same time. Similarly, implementations described herein may allow a user to hear audio data received from multiple tuners at a same time. For example, a set-top box may provide audio data for multiple TV programs to speakers to be output at the same time.

Figure 1:
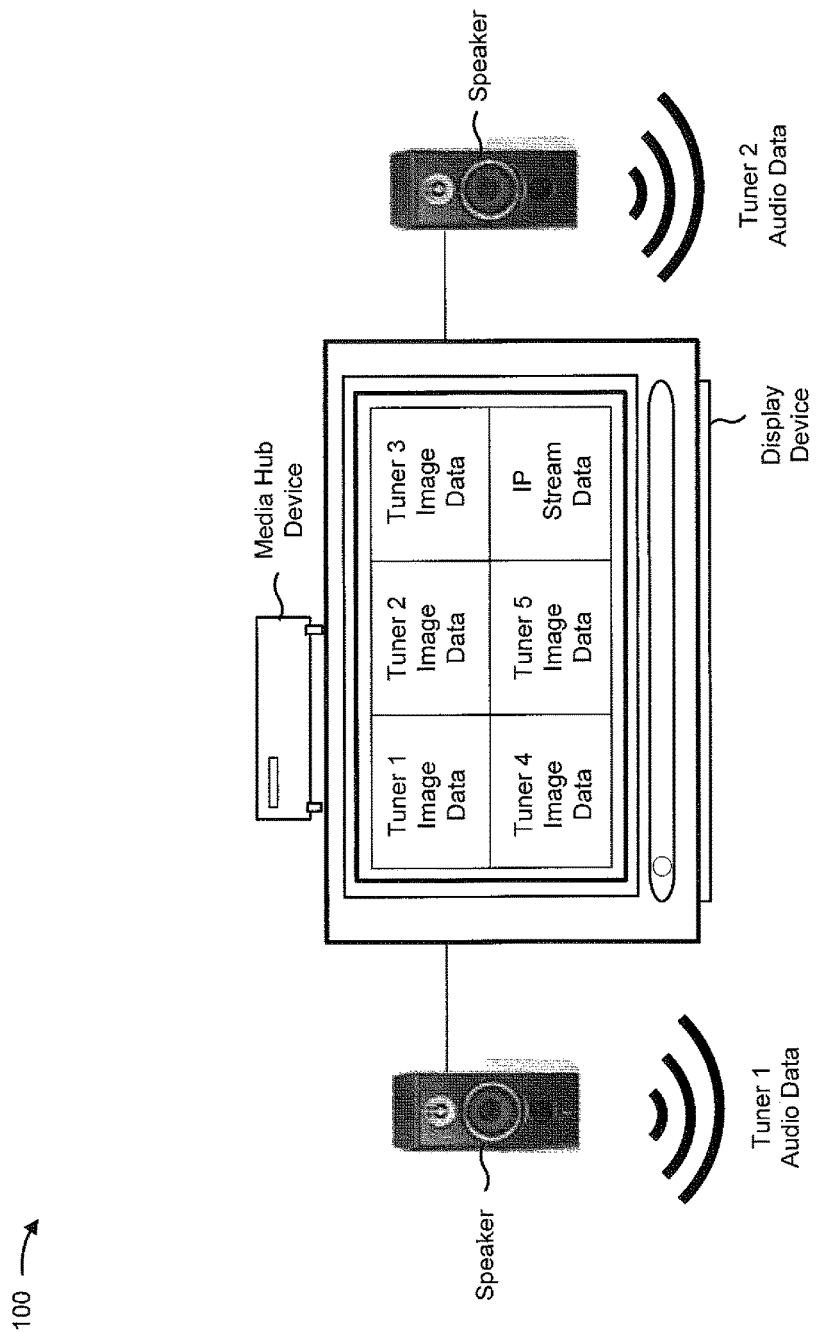
FIG. 1 is a diagram of an overview of an example implementation described herein.

FIG. 1 is a diagram of an overview of an example implementation 100 described herein. In example implementation 100, assume a media hub device (e.g., a set-top box) includes multiple tuners (e.g., five tuners). Also, assume a user of the media hub device selects a TV channel for each tuner to be tuned. Further, assume that the tuners are tuned to the selected TV channels and that each of the tuners receive multimedia content via a respective TV channel. For example, each tuner may receive image data for a TV program broadcast on the TV channel and audio data for the TV program broadcast on the TV channel. In some implementations, the media hub device may receive image data and audio data from sources other than a TV channel via a tuner. For example, the media hub device may receive image data and audio data for a program(s) via a network (e.g., an IP stream) and/or from a memory that stores image data and audio data included in the media hub device.

A shown in FIG. 1, the media hub device may provide image data from each of the multiple tuners to a display device for display. The display device may display the image data from the multiple tuners at the same time. Furthermore, the display device may display the image data from the other sources at the same time (e.g., image data from an IP stream). Accordingly, a user may view TV programs broadcast on different TV channels and/or IP streams at the same time on a same display device.

Similarly, the media hub device may provide audio data from more than one of the tuners or other sources to speakers for output. For example, the media hub device may provide audio data from a first tuner (e.g., for a first TV program broadcast on a first TV channel) to a left speaker, and may provide audio data from a second tuner (e.g., for a second TV program broadcast on a second TV channel) to a right speaker. Accordingly, the user may listen to audio data from more than one tuner or more than source at the same time.

In some implementations, the media hub device may not provide audio data from each of the tuners or sources from which image data is provided. For example, a user may be able to comfortably watch image data from two, three, four, five, six, or more TV channels at the same time. However, the user may not be able to comfortably listen to audio data from as many TV channels at the same time. Accordingly, the media hub device may or may not provide audio data for each of the TV channels for which image data is provided.

In this way, a user may watch and listen to multiple programs from multiple sources (e.g., different TV channels, different IP streams, and/or different stored locations) at a same time.

Figure 2:
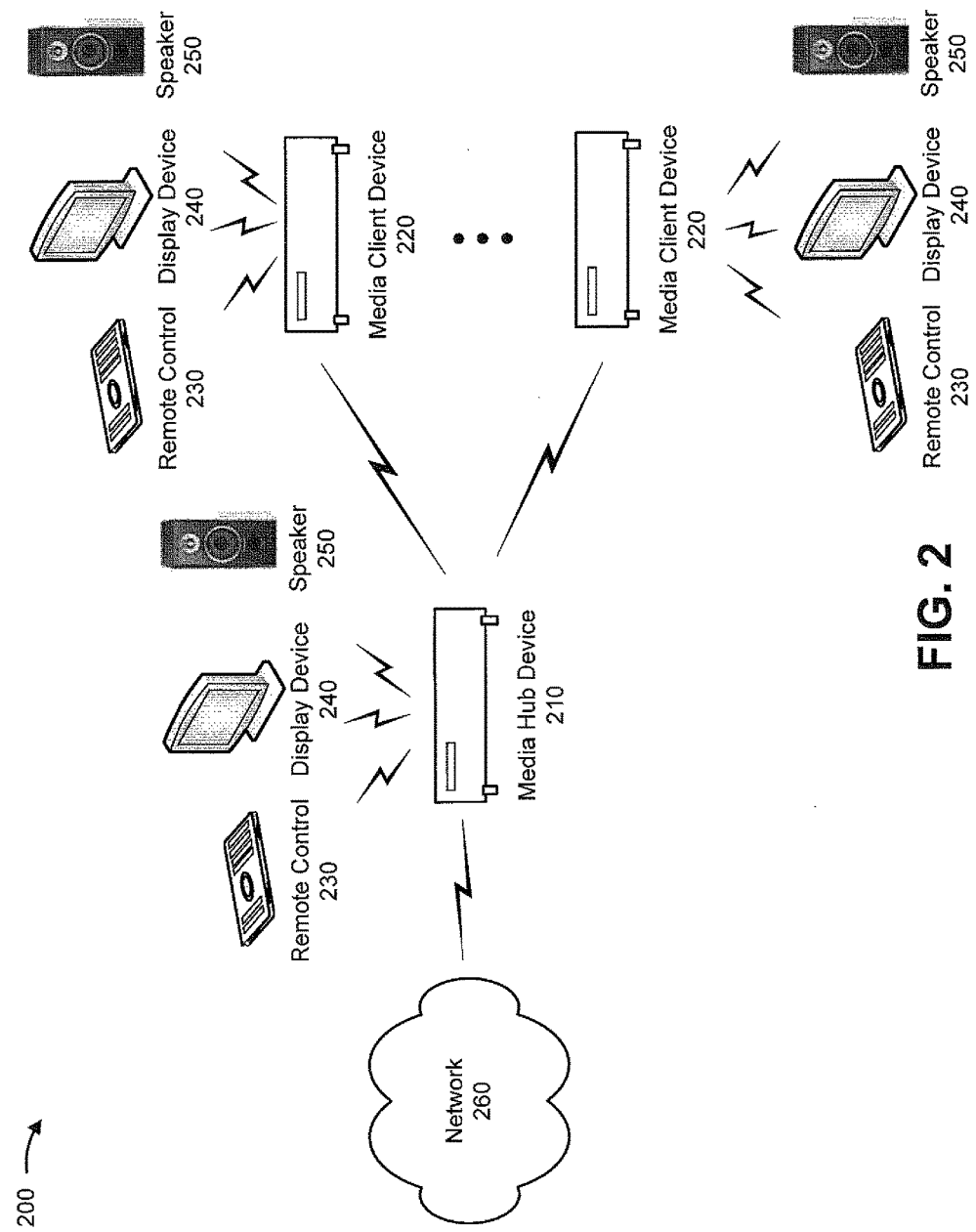
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a media hub device 210, a media client device 220, a remote control 230, a display device 240, a speaker 250, and/or a network 260. Devices of environment 200 may interconnect via wired connections, wireless connections, or a combination of wired and wireless connections.

Media hub device 210 may include a device capable of receiving, transmitting, and/or processing multimedia content and providing the multimedia content to a user (e.g., via display device 240 and/or speaker 250). Media hub device 210 may allow a user to provide input via an electronic program guide (EPG), and to alter programming and/or content provided by media hub device 210 based on a signal from, for example, remote control 230. Examples of media hub device 210 may include a set-top box, a casting stick (e.g., a high-definition media interface (HDMI) dongle), a computer, a cable card, a gaming device, a portable electronic device, and/or other types of devices capable of receiving, transmitting, and/or processing multimedia content and providing the multimedia content to a user. In some implementations, media hub device 210 may include multiple tuners that may tune to different TV channels. For example, media hub device 210 may include two, three, four, five, six, or more tuners. In some implementations, media hub device 210 may receive image data and audio data via an IP stream from a network (e.g., network 260). Additionally, or alternatively, media hub device 210 may be connected to multiple media client devices 220 and provide network streams of multimedia content received via the tuners to the media client devices 220. Media hub device 210 may be connected to media client device(s) 220 via a wired connection (e.g., a coaxial cable) and/or a wireless connection.

Media client device 220 may include a device capable of receiving, transmitting, and/or processing multimedia content and providing the multimedia content to a user (e.g., via display device 240 and/or speaker 250). Media client device 220 may allow a user to provide input via an electronic program guide (EPG) and to alter programming and/or content provided by media client device 220 based on a signal from, for example, remote control 230. Examples of media client device 220 may include a set-top box, a casting stick (e.g., a high-definition media interface (HDMI) dongle), a computer, a cable card, a gaming device, a portable electronic device, and/or other types of devices capable of receiving, transmitting, and/or processing multimedia content and providing the multimedia content to a user. In some implementations, media client device 220 may not include a tuner for receiving multimedia content via TV channels. Rather, media client device 220 may access a tuner included in media hub device 210 and receive multimedia content (e.g., image data, audio data, metadata, etc.) via a network stream provided by media hub device 210.

Remote control 230 may include a device that allows a user to control programming, applications, and/or content displayed on display device 240 via interaction with media hub device 210 and/or media client device 220. Remote control 230 may transmit signals, such as, for example, infrared signals, to a signal receiver associated with media hub device 210 and/or media client device 220. Remote control 230 may take the form of a standard remote, a keyboard, a smart phone, etc. Any function, described herein, as being performed by remote control 230, may be performed directly on media hub device 210 and/or media client device 220 using, for example, one or more buttons on media hub device 210 and/or media client device 220.

Display device 240 may include any digital or analog display that is capable of presenting audio and/or video content provided by media hub device 210 and/or media client device 220. Display device 240 may include a technology, such as a cathode ray tube (CRT) display, a liquid crystal display (LCD), a light-emitting diode (LED) display, a plasma display, etc. Examples of display device 240 may include a TV, a projector, a computer monitor, and/or another type of device capable of presenting audio and/or video content.

Speaker 250 may include a speaker that produces sound in response to an audio signal input. More than one speaker 250 may be connected to media hub device 210 and/or media client device 220. For example, two speakers 250 may be connected for stereo sound, six speakers may be connected for six-channel surround sound (e.g., 5.1 surround sound), eight speakers may be connected for eight-channel surround sound (e.g., 7.1 surround sound), etc. Each speaker 250 may receive an audio signal via a respective audio channel (e.g., a front left audio channel, a front right audio channel, a center audio channel, etc.). Speaker 250 may receive an audio signal directly from media hub device 210 and/or media client device 220, or indirectly from media hub device 210 and/or media client device 220 (e.g., via display device 240 and/or an audio receiver (not shown)).

In some implementations, media hub device 210, display device 240, and/or speaker 250 may be included in a same device. Likewise, media client device 220, display device 240, and/or speaker 250 may be included in a same device.

Network 260 may include one or more wired and/or wireless networks. For example, network 260 may include a cellular network, a public land mobile network ("PLMN"), a second generation ("2G") network, a third generation ("3G") network, a fourth generation ("4G") network, a fifth generation ("5G") network, a long term evolution ("LTE") network, and/or a similar type of network. Additionally, or alternatively, network 260 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a satellite network, a television network, a cloud computing network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
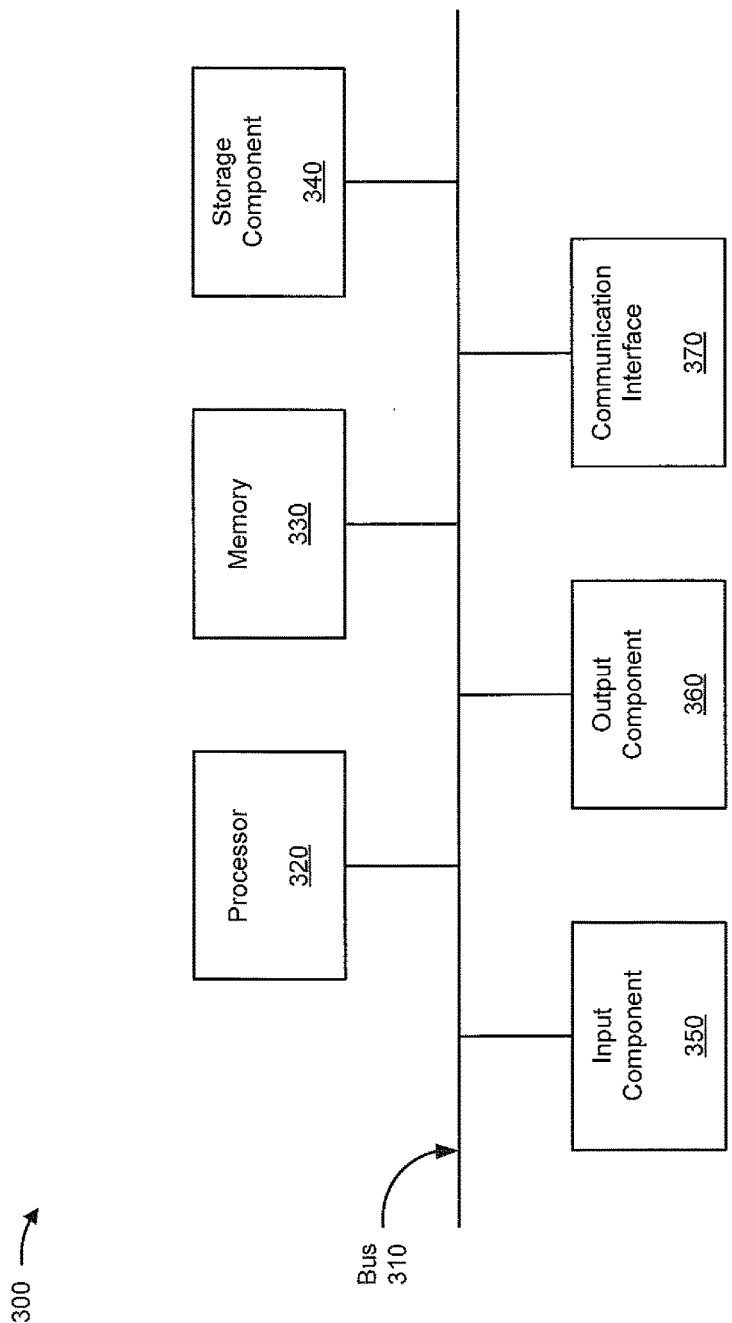
FIG. 3 is a diagram of example components of one or more devices of FIG. 2.

FIG. 3 is a diagram of example components of a device 300. Device 300 may correspond to media hub device 210, media client device 220, remote control 230, display device 240, and/or speaker 250. In some implementations, media hub device 210, media client device 220, remote control 230, display device 240, and/or speaker 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). In some implementations, input compartment 350 may include a tuner that receives multimedia content via a TV channel. Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
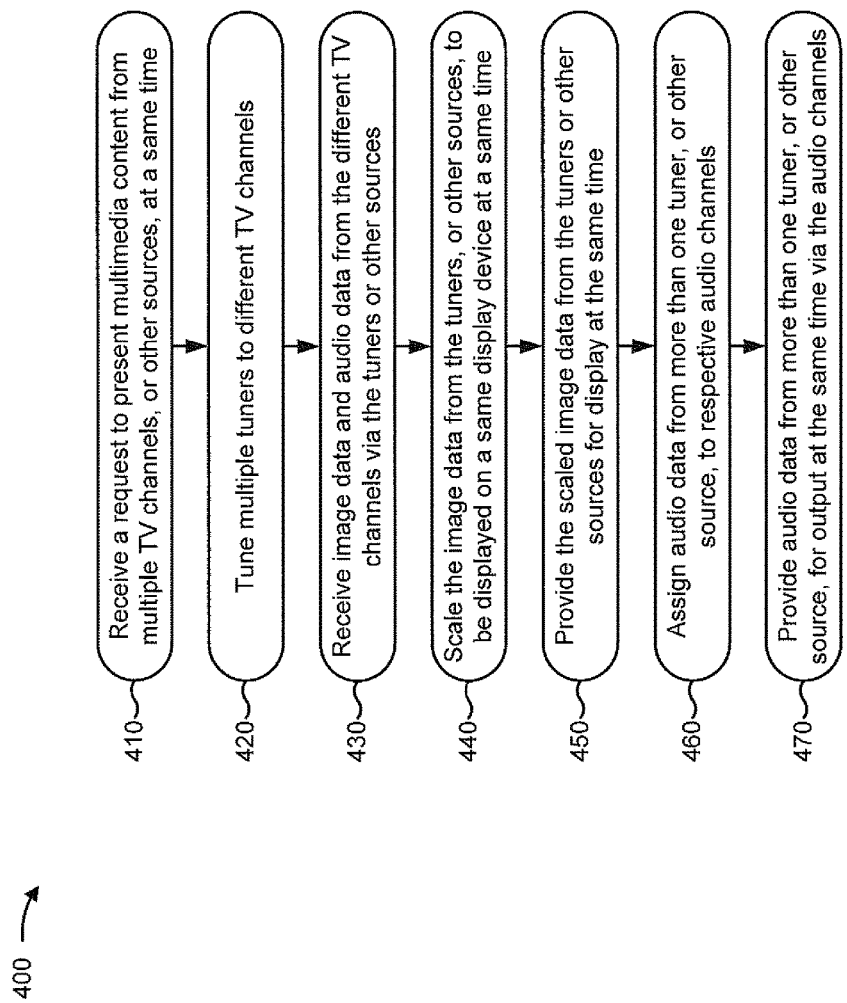
FIG. 4 is a flow chart of an example process for providing image data and audio data from multiple sources for presentation.

FIG. 4 is a flow chart of an example process 400 for providing image data and audio data from multiple sources for presentation. In some implementations, one or more process blocks of FIG. 4 may be performed by media hub device 210. In some implementations, one or more process blocks of FIG. 4 may be performed by another device or a group of devices separate from or including media hub device 210, such as media client device 220, remote control 230, display device 240, and/or speaker 250.

FIG. 4 describes providing image data and audio data received by tuners for presentation, but it should be understood that image data and audio data from other sources (e.g., IP data streams and/or stored files) may also be presented for presentation.

As shown in FIG. 4, process 400 may include receiving a request to output multimedia content from multiple TV channels, or other sources, at a same time (block 410). For example, media hub device 210 may receive a request to output multimedia content from multiple TV channels at a same time.

Media hub device 210 may provide an EPG (e.g., an interactive program guide (IPG)) to display device 240 for display. Display device 240 may receive the EPG and display the EPG. A user may see the EPG displayed by display device 240 and use remote control 230 to provide inputs to media hub device 210 using the EPG.

The EPG may include an option to present multimedia content from multiple TV channels at a same time. In other words, the EPG may include an option to output multimedia content received via multiple tuners, included in media hub device 210, at a same time. In some implementations, the EPG may include an option that allows the user to select which TV channels are to be displayed at a same time.

In some implementations, media client device 220 may have access to a tuner included in media hub device 210. Media client device 220 may send a request to media hub device 210 to tune a tuner to a particular TV channel (e.g., based on a user input sent from remote control 230 to media client device 220). Media hub device 210 may receive the request and tune a tuner to the particular TV channel based on the request. Media hub device 210 may receive multimedia content from network 260 via the tuner tuned to the particular TV channel. Media hub device 210 may send the multimedia content from the tuner (e.g., for the particular TV channel) to media client device 220 via a network stream. Media client device 220 may receive the multimedia content via the network stream and provide the multimedia content to display device 240 and/or speaker 250 for presentation.

Accordingly, the EPG may provide an option (e.g., a parental control option) that allows multimedia content, received via a tuner(s) accessed by media client device(s) 220, to be presented by display device 240 and/or speaker 250 connected to media hub device 210. In other words, the EPG may provide an option for a user of media hub 210 to be presented with the multimedia content being watched by users of media client devices 220.

The user of media hub device 210 may input a selection, via remote control 230, of the option to present multimedia content from multiple TV channels at a same time. Remote control 230 may send the input to the media hub device 210 and media hub device 210 may receive the input. Media hub device 210 may determine that the user selected the option to present multimedia content from multiple TV channels at the same time based on the input.

As further shown in FIG. 4, process 400 may include tuning multiple tuners to different TV channels (block 420). For example, media hub device 210 may tune multiple tuners to different TV channels.

In some implementations, media hub device 210 may tune the tuners to particular TV channels based on user input from remote control 230. For example, a user of media hub device 210 may input TV channel selections (e.g., a channel number, a channel up command, a channel down command, etc.) for one or more tuners into remote control 230 and remote control 230 may send the TV channel selections to media hub device 210. Media hub device 210 may receive the TV channel selections and tune the tuners to the TV channels based on the TV channel selections. In other words, once the user has requested that multimedia content from multiple TV channels be presented at a same time (e.g., at block 410), the user may select which TV channels should be presented and media hub device 210 may tune the tuners to the selected TV channels.

Additionally, or alternatively, media hub device 210 may tune one or more tuners to TV channels based on requests from one or more media client devices 220 connected to media hub device 210. For example, a user of media client device 220 may input a TV channel selection into remote control 230 and remote control 230 may send the TV channel selection to media client device 220. Media client device 220 may receive the TV channel selection and send a request to media hub device 210 to tune a tuner based on the selected TV channel. Media hub device 210 may receive the request and tune the tuner to a particular TV channel based on the request. Media hub device 210 may provide a network stream of multimedia content received by the tuner (e.g., a TV program being broadcast on the TV channel) to media client device 220 for presentation by display device 240 and/or speaker 250.

In some implementations, tuners being used to provide network streams to media client devices 220 may be locked at the media hub device 210 end, and a user of media hub device 210 may not be able to change the TV channels to which these tuners are tuned. In other words, if a user of media client device 220 is accessing multimedia content via a tuner included in media hub device 210, a user of media hub device 210 may not be able to change the TV channel to which that tuner is tuned. Locking the tuner may prevent the user of media hub device 210 from intentionally or unintentionally disrupting the multimedia content being watched by the user of media client device 220. In this way, the user of media hub device 210 (e.g., a parent) may be able to monitor what a user of media client device 220 (e.g., a child) is watching without the user of media client device 220 knowing that the user of media hub device 210 is monitoring what is being watched.

On the other hand, the user of media hub device 210 may be able to tune a tuner being used to provide a network stream to media client device 220. In this case, the multimedia content provided to media client device 220 may change when media hub device 210 changes the TV channel to which that tuner is tuned, and the user of media client device 220 may be able to determine that the user of media hub device 210 is monitoring what is being watched on media client device 220. In some cases, like if a parental control option is selected, the user of media hub device 210 may want the ability to change which TV channel a tuner being used to provide a network stream to media client device 220 is tuned to if the user of media hub device 210 determines that the multimedia content being presented on media client device 220 is inappropriate for the user of media client device 220. Accordingly, media hub device 210 may tune a tuner being used to provide a network stream to media client device 220 to a particular TV channel based on an input from a user of media hub device 210. Additionally, or alternatively, media hub device 210 may block the network stream of the multimedia content from being provided to media client device 220 based on a user input (e.g., if a parent deems the multimedia content unsuitable for a child using media client device 220).

In some implementations, media hub device 210 may tune a tuner based on an instruction to record a TV program on a particular TV channel. For example, media hub device 210 may include a digital video recorder (DVR) and media hub device 210 may tune a tuner to a TV channel in order to record the TV program. In some implementations, the tuner may be locked while the TV program is being recorded and a user of media hub device 210 may not be able to change the TV channel to which the tuner is tuned, so as not to disrupt the recording of the TV program.

Media hub device 210 may tune the tuners to different TV channels based on any combination of the described ways to tune the tuner. For example, media hub device 210 may tune a first tuner based on a user input, a second tuner based on a request from media client device 220, and/or a third tuner based on a scheduled recording of a TV program.

As further shown in FIG. 4, process 400 may include receiving image data and audio from the different TV channels via the tuners (block 430). For example, media hub device 210 may receive the image data and the audio data from the different TV channels via the tuners. Additionally, or alternatively, media hub device 210 may receive image data and audio data from other sources (e.g., IP data streams and/or files stored in a memory included in media hub device 210).

Media hub device 210 may receive multimedia content from each TV channel via a respective tuner tuned to each TV channel. The multimedia content received via each tuner may include image data and audio data for the TV channel. The image data may include an image and/or video to be displayed on display device 240. The audio data may include sound to be emitted by speaker 250.

As further shown in FIG. 4, process 400 may include scaling the image data from the tuners, or other sources, to be displayed on a same display device 240 at a same time (block 440). For example, media hub device 210 may scale the image data.

Media hub device 210 may receive image data from multiple tuners. The image data received from each tuner may correspond to a different TV program being broadcast on a respective TV channel. Accordingly, media hub device 210 may have image data from multiple tuners to be provided for display at a same time. For example, media hub device 210 may have a video from a first tuner to display at the same time as a video from a second tuner.

Media hub device 210 may scale the image data from each of the tuners such that the image data from each of the tuners may be displayed on a same display. For example, media hub device 210 may configure the size and/or shape of the image data based on the number of tuners from which image data is received. In some implementations, media hub device 210 may scale the image data from each of the tuners the same way. For example, if there is image data provided from six tuners to be displayed on display device 240, media hub device 210 may scale the image data from each of the six tuners to be one-sixth of the view to be displayed. Additionally, or alternatively, media hub device 210 may scale the image data from each of the tuners differently. In other words, the image data from each tuner may be scaled to be displayed in different sizes and/or shapes. For example, the size of image data from a first tuner may be scaled to be twice the size of image data from a second tuner.

Additionally, or alternatively, media hub device 210 may determine a layout of the scaled image data for display. For example, the image data from the tuners may be laid out in a grid or other arrangement. The scaling and layout of the image data from the tuners may be user customizable.

As further shown in FIG. 4, process 400 may include providing the scaled image data from the tuners, or another source, for display at the same time (block 450). For example, media hub device 210 may provide the scaled image data from multiple tuners to display device 240 for display. Display device 240 may receive the scaled image data and display the image data at the scale and layout determined at block 440.

As further shown in FIG. 4, process 400 may include assigning audio data from more than one tuner, or other sources, to respective audio channels (block 460). For example, media hub device 210 may assign the audio data from more than one tuner to respective audio channels.

In some implementations, media hub device 210 may assign audio data from each tuner, which receives multimedia content, to an audio channel. For example, assume there are three tuners included in media hub device 210 that each receives multimedia content (e.g., audio data and image data) from a respective TV channel. Audio data from a first tuner may be assigned to a first audio channel (e.g., a front left audio channel), audio data from a second tuner may be assigned to a second audio channel (e.g. a front right audio channel), and audio data from a third tuner may be assigned to a third audio channel (e.g., a center audio channel). Accordingly, image data from all three tuners may be provided for display at the same time, and audio data for all three tuners may be assigned to respective audio channels to be output at the same time.

Additionally, or alternatively, media hub device 210 may assign audio data from only some of the tuners, which receive multimedia content, to an audio channel. For example, assume there are three tuners included in media hub device 210 that each receives multimedia content (e.g., audio data and image data) from respective TV channels. Audio data from a first tuner may be assigned to a first audio channel, audio data from a second tuner may be assigned to a second audio channel, and audio data from the third tuner may not be assigned to any audio channel. Accordingly, although image data from all three tuners may be provided for display at the same time, only audio data from two of the tuners may be assigned to respective audio channels to be output at the same time. Media hub device 210 may not assign audio data from all the tuners to audio channels to reduce any confusion or sense of being overwhelmed that having audio data from multiple different tuners (e.g., audio for multiple TV programs) being output at once may cause.

In some implementations, media hub device 210 may assign audio data from one tuner to all audio channels. For example, the audio data from the tuner may be 7.1 surround sound assigned to eight audio channels.

In some implementations, media hub device 210 may assign mono audio data from two tuners to two respective audio channels, mono audio data from three tuners to three respective audio channels, mono audio data from four tuners to four respective audio channels, and so on.

In some implementations, media hub device 210 may assign stereo audio data from two tuners to four respective audio channels. For example, stereo audio from a first tuner may be assigned to two front audio channels and stereo audio from a second tuner may be assigned to two back audio channels. Likewise, media hub device 210 may assign stereo audio data from three tuners to six respective audio channels, and so on.

In some implementations, media hub device 210 may assign audio data from multiple tuners to a same audio channel. In other words, media hub device 210 may combine audio data from multiple tuners and assign the combined audio data to a single audio channel.

In some implementations, media hub device 210 may assign audio data from a tuner to a respective audio channel based on user input. For example, a user of media hub device 210 may select which audio data from a tuner is assigned to which audio channel(s). Furthermore, a user may control how long each audio data is assigned to a respective audio channel and/or may rotate the audio data between different audio channels. Additionally, or alternatively, media hub device 210 may assign audio data from a tuner to a respective audio channel based on where the image data from the same tuner is to be displayed (e.g., where in the layout the image data is positioned). For example, if image data from a first tuner is to be displayed in a top left corner of display device 240, the audio data from the first tuner may be assigned to a front left audio channel. In some implementations, a display size of the image data, corresponding to audio data from a tuner assigned to an audio channel, may be bigger than a display size of image data from a tuner that does not have corresponding audio data assigned to an audio channel. Additionally, or alternatively, image data corresponding to audio data assigned to an audio channel may be flagged (e.g., on display device 240) to indicate that the corresponding audio data is assigned to an audio channel.

In some implementations, the audio data from each tuner may include different kinds of audio data associated with different packet identifiers (PIDs). For example, audio data from a tuner may include primary audio data associated with a first PID, secondary audio data associated with a second PID, and/or tertiary audio data associated with a third PID. Media hub device 210 may select a PID in the audio data and assign the kind of audio data associated with the PID to an audio channel for output by speaker 250. For example, media hub device 210 may select a PID in the audio data based on user input and/or the audio channel to which the audio data is assigned.

As further shown in FIG. 4, process 400 may include providing the audio data from more than one tuner, or other sources, for output at a same time via the assigned audio channels (block 470). For example, media hub device 210 may provide the audio data to speaker 250 via the assigned audio channels. Speakers 250 may receive the audio data, from the multiple tuners, and emit the audio data at the same time.

Thus, display device 240 may display image data for multiple tuners while speakers 250 emit the corresponding audio data for all or some of the tuners.

Although FIG. 4 has primarily been described with respect to receiving multimedia content from TV channels via tuners, media hub device 210 may receive multimedia content from other sources, such as via IP streams from network 260 and/or from a memory included in media hub device 210, and/or a combination of sources. For example, media hub device 210 may receive multimedia content from one or more TV channels (via one or more tuners) at the same time as multimedia content from network 260 (via an IP stream). Media hub device 210 may cause display of image data from both sources and select audio data from the different sources for output.

Furthermore, although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
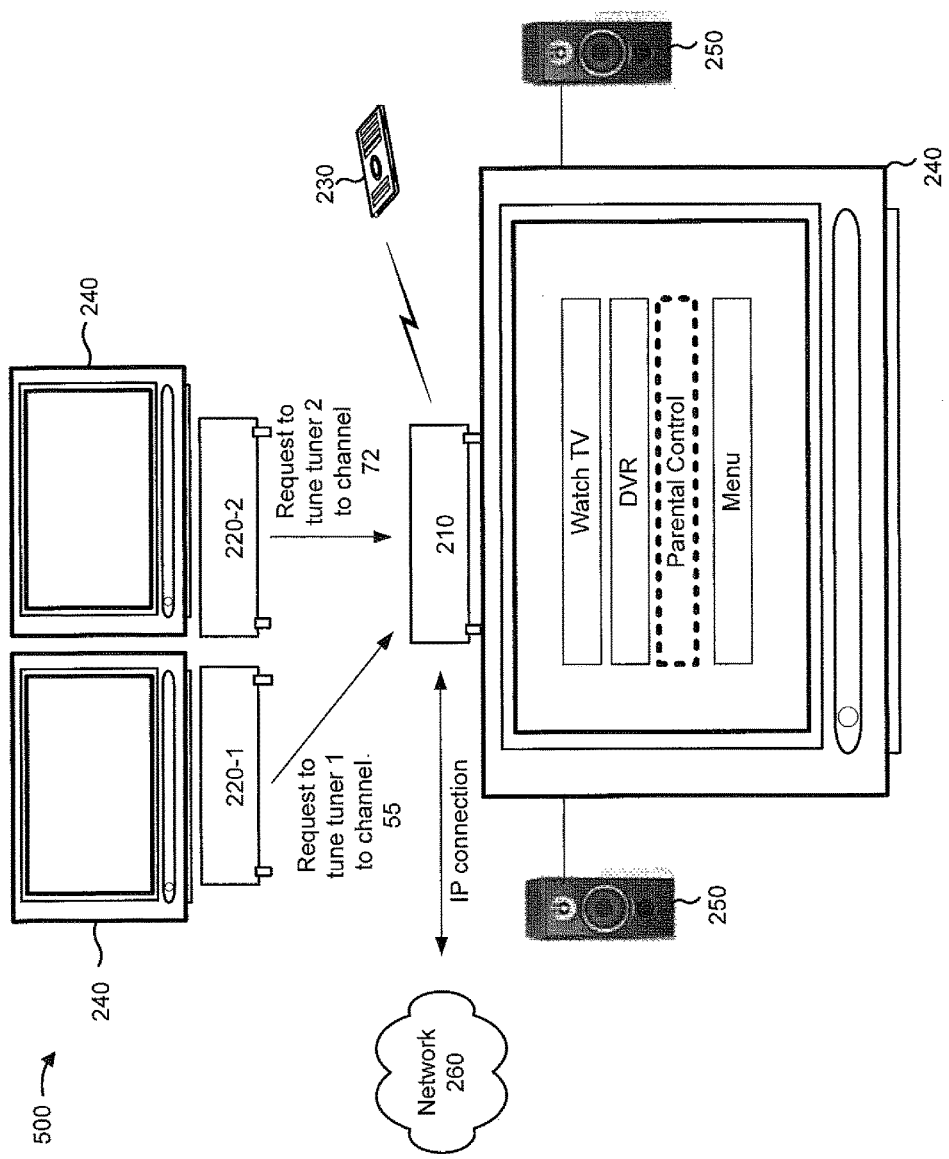
FIGS. 5A and 5B are diagrams of an example implementation relating to the example process shown in FIG. 4.
Figure 5B:
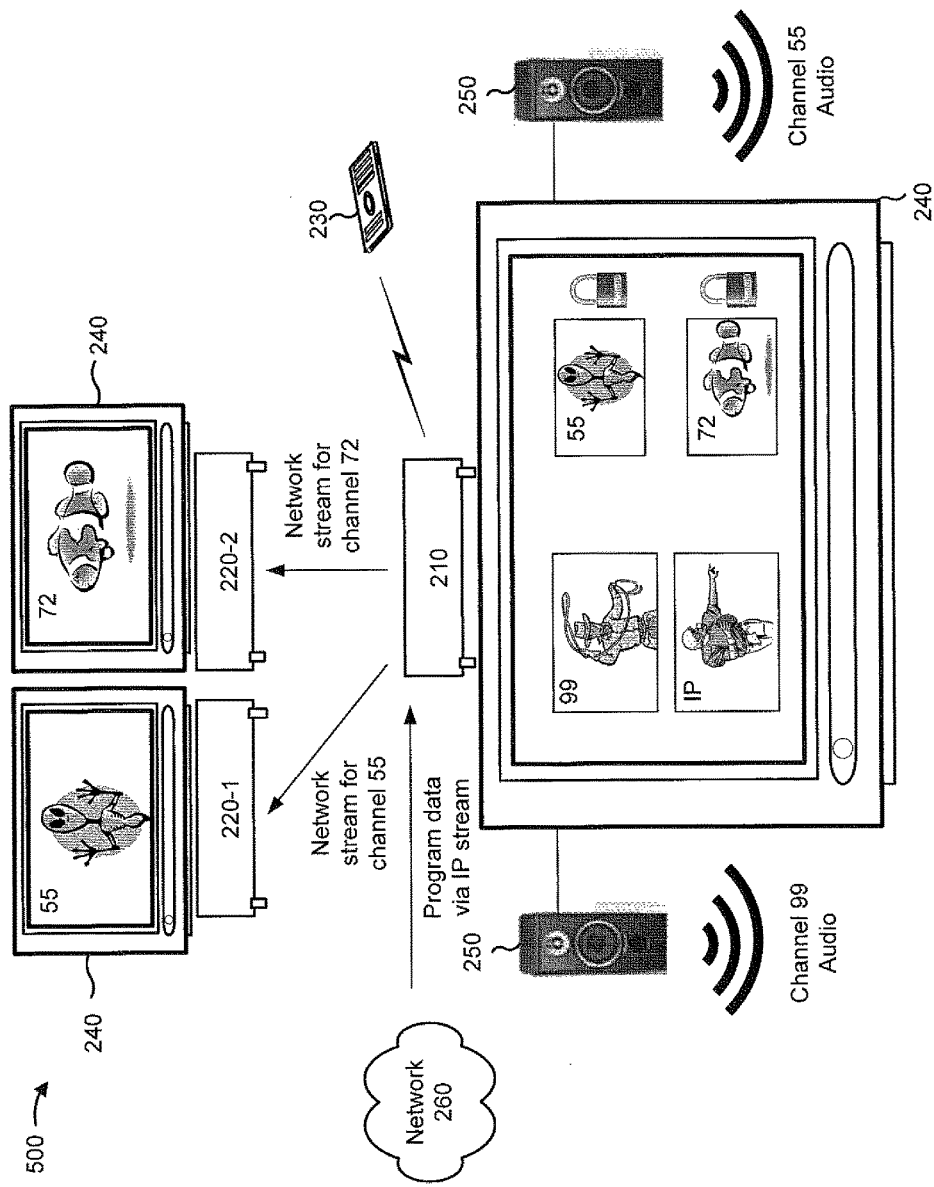

FIGS. 5A and 5B are diagrams of an example implementation 500 relating to example process 400 shown in FIG. 4. FIGS. 5A and 5B show an example of providing image data and audio data from multiple tuners for presentation. More specifically, FIGS. 5A and 5B show an example of a parental control feature that allows a parent using media hub device 210 to monitor TV programs that children are watching on media client devices 220 while watching another TV program selected by the parent.

In example implementation 500, assume a first child uses media client device 220-1, a second child uses media client device 220-2, and a parent uses media hub device 210. Assume media hub device 210 includes at least three tuners.

Further, assume the first child inputs a command to media client device 220-1 (e.g., via a remote control (not shown))

to watch a TV program on channel 55. As shown in FIG. 5A, media client device 220-1 may send a request to media hub device 210 to tune a first tuner to channel 55.

Also, assume the second child inputs a command to media client device 220-2 (e.g., via a remote control (not shown)) to watch a TV program on channel 72. As shown in FIG. 5A, media client device 220-2 may send a request to media hub device 210 to tune a second tuner to channel 72.

As further shown in FIG. 5A, media hub device 210 may cause display device 240 to display an EPG. The EPG may prompt the parent to select a feature to use (e.g., a "Watch TV" feature, a "DVR" feature, a "Parental Control" feature, and/or a "Menu" feature). The parent may use remote control 230 to send a signal to media hub device 210 to select the "Parental Control" feature. The "Parental Control" feature may allow the parent to view TV channels to which the first tuner and the second tuner are tuned (e.g., the TV channels being watch via media client devices 220-1 and 220-2), and allow the parent to select a third TV channel to watch via a third tuner included in media hub device 210. The parent may also view a program via an IP connection with network 260 (e.g., via the Internet).

As shown in FIG. 5B, media hub device 210 may tune the first tuner to channel 55 based on the request from media client device 220-1, and send a network stream of image data and audio data for channel 55 to media client device 220-1. Media client device 220-1 may receive the network stream and cause a connected display device 240 and connected speakers (not shown) to output the image data and the audio data for channel 55.

Similarly, media hub device 210 may tune the second tuner to channel 72 based on the request from media client device 220-2, and send a network stream of image data and audio data for channel 72 to media client device 220-2. Media client device 220-2 may receive the network stream and cause a connected display device 240 and connected speakers (not shown) to output the image data and the audio data for channel 72.

As further shown in FIG. 5B, media hub device 210 may provide image data from the first tuner (e.g., for channel 55) and image data from the second tuner (e.g., for channel 72) to a connected display device 240 for display. Display device 240 may display both the image data for channel 55 and the image data for channel 72, such that the parent may monitor what the children are watching via media client devices 220-1 and 220-2. Furthermore, display device 240 may display an indicator (e.g., a lock) next to the image data from the first tuner and the image data from the second tuner indicating that the tuners are locked and the parent may not change TV channels to which the first tuner and the second tuner are tuned.

The parent may also use remote control 230 to input a command to media hub device 210 to tune a third tuner to channel 99. Media hub device 210 may tune the third tuner to channel 99 and provide image data for channel 99 to display device 240. Display device 240 may display the image data from the third tuner for channel 99. The third tuner may not be locked and the parent may be able to change the TV channel to which the third tuner is tuned while monitoring what the children are watching via the first and second tuners.

The parent may also use remote control 230 to input a command to media hub device 210 to watch a program via an IP stream. Media hub device 210 may obtain program data for the program via an IP stream and provide image data for the program to display device 240. Display device 240 may display the image data from the IP stream.

Media hub device 210 may assign audio data from the third tuner (e.g., for channel 99) to a left audio channel. The parent may select which of the first tuner or the second tuner to output audio data. Assume the parent selects audio data from the first tuner should be output to speakers. Thus, media hub device 210 may assign audio data from the first tuner (e.g., for channel 55) to a right audio channel. Accordingly, media hub device 210 may provide audio data for channel 99 to a right speaker 250 via the right audio channel, and the right speaker 250 may output audio for channel 99. Likewise, media hub device 210 may provide audio data for channel 55 to a left speaker 250 via the let audio channel, and the left speaker 250 may output audio for channel 55.

In this way, the parent may be provided with image data from multiple sources at the same time (including tuners used by the children via media client devices 220) and audio data from multiple sources at the same time.

As indicated above, FIGS. 5A and 5B are provided merely as an example. Other examples are possible and may differ from what was described with regard to FIGS. 5A and 5B.

Figure 6A:
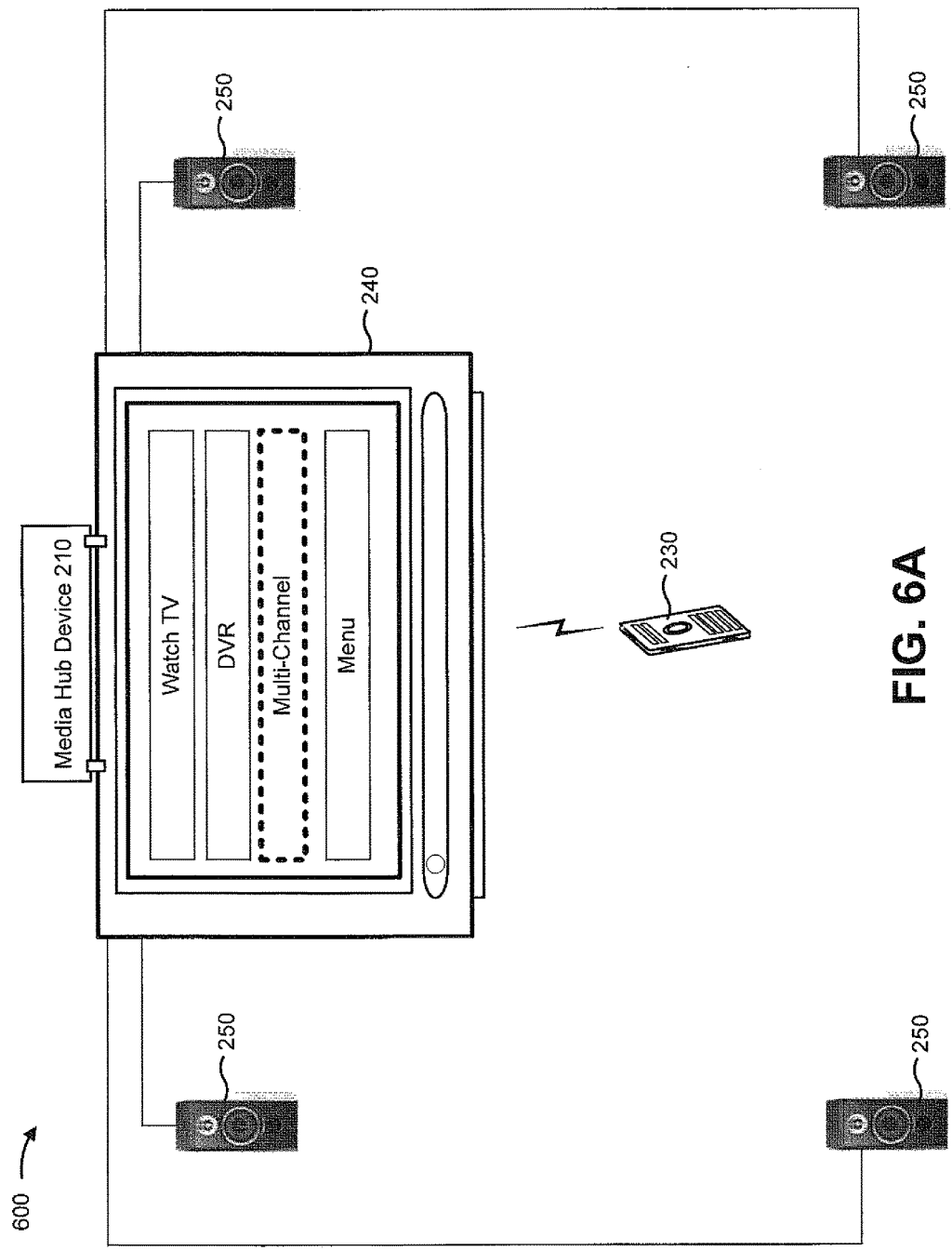
FIGS. 6A-6C are diagrams of an example implementation relating to the example process shown in FIG. 4.
Figure 6B:
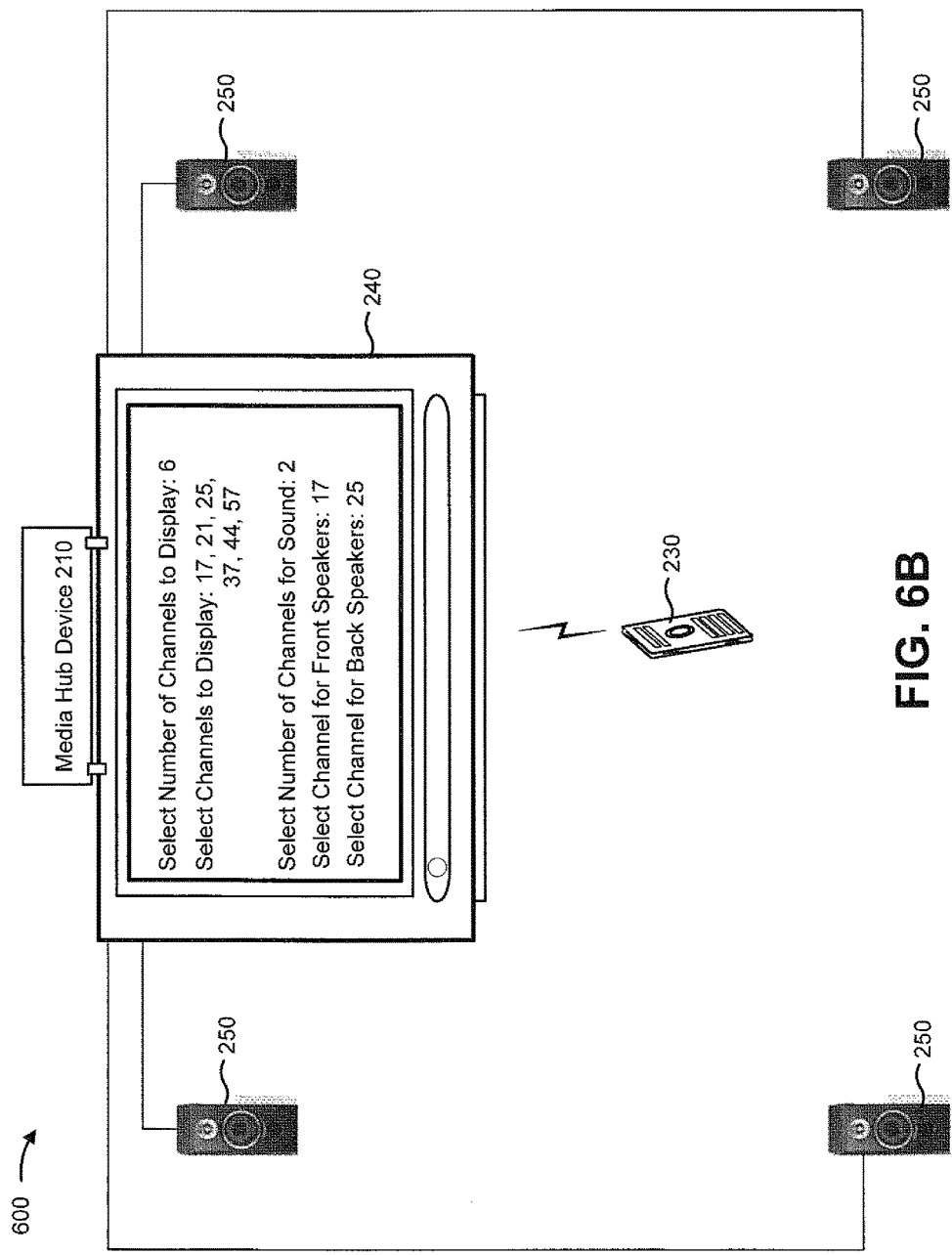
Figure 6C:
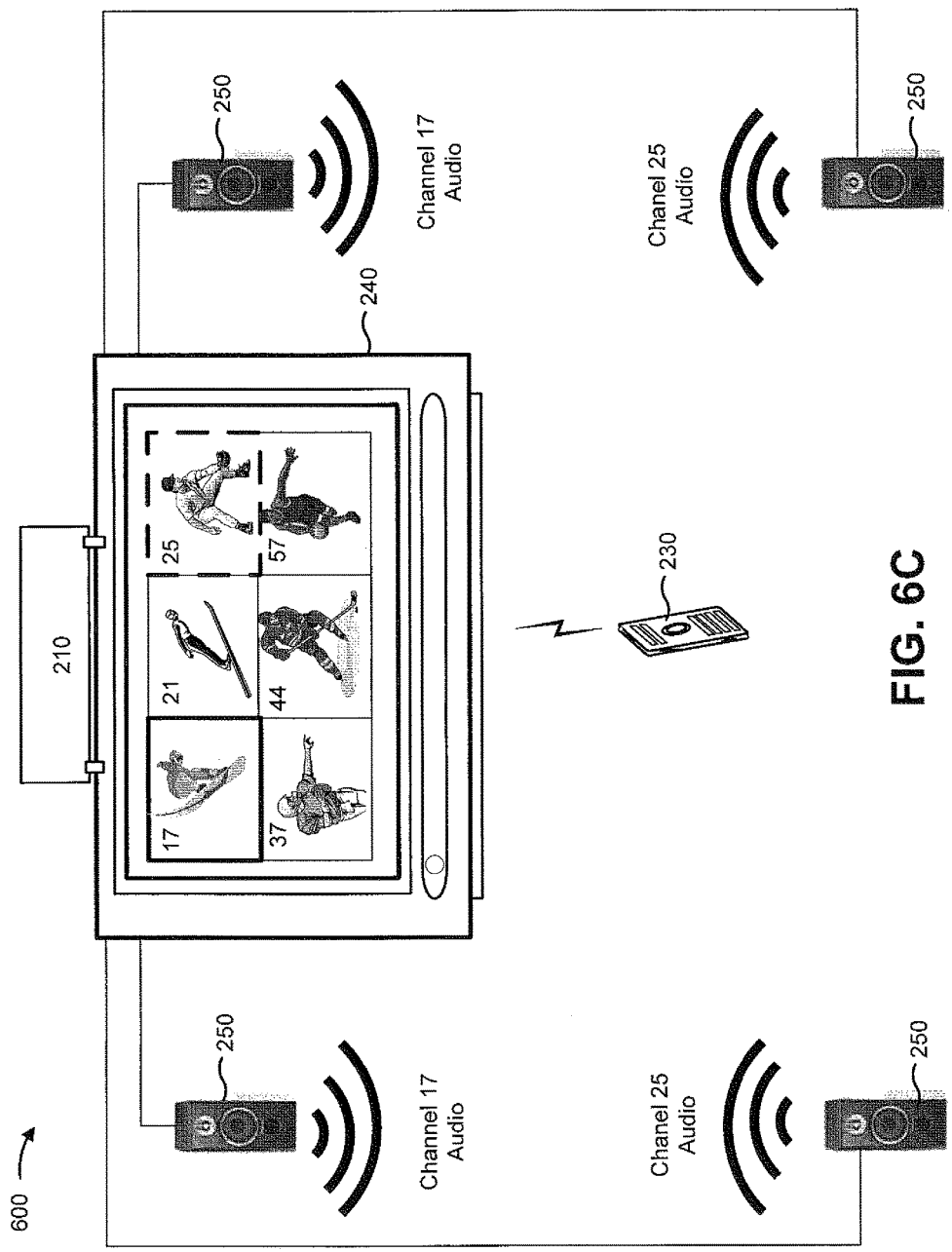

FIGS. 6A-6C are diagrams of an example implementation 600 relating to example process 400 shown in FIG. 4. FIGS. 6A-6C show an example of providing image data and audio data from multiple tuners for presentation. More specifically, FIGS. 6A-6C show an example of a multi-channel feature that allows a user of media hub device 210 to watch more than one TV program at the same time.

In implementation 600, assume media hub device 210 is connected to a display device 240 and four speakers 250 (e.g., a front left speaker, a front right speaker, a back left speaker, and a back right speaker). Further, assume media hub device 210 includes six tuners.

As shown in FIG. 6A, media hub device 210 may cause display device 240 to display an EPG. The EPG may prompt the user to select a feature to use (e.g., a "Watch TV" feature, a "DVR" feature, a "Multi-Channel" feature, and/or a "Menu" feature). The "Multi-Channel" feature may allow the user to watch TV programs on multiple channels at the same time.

The user may use remote control 230 to send a signal to media hub device 210 to select the "Multi-Channel" feature. For example, there may be multiple sporting events being broadcast on different TV channels that the user may want to watch at the same time.

In FIG. 6B, assume media hub device 210 has activated the "Multi-Channel" feature and prompts a user to select the number of TV channels to display and to select the TV channels to display. As shown in FIG. 6B, the user may select six TV channel to display at the same time and select six TV channels to which to tune the tuners (e.g., TV channels 17, 21, 25, 37, 44, and 57). Furthermore, assume media hub device 210 prompts the user to select a number of TV channels to emit sound at the same time. As shown in FIG. 6B, the user may select two TV channels to emit sound. The user may also select speakers to emit sound from each TV channel. For example, the user may select the front speakers to emit sound from TV channel 17, and may select the back speakers to emit sound from TV channel 25.

In FIG. 6C, assume media hub device 210 tunes the six tuners to TV channels, 17, 21, 25, 37, 44, and 57. Media hub device 210 may scale the image data from each tuner to be displayed on a same display device 240 and arrange the image data for the TV channels in a grid. Media hub device 210 may provide the scaled image data from the six tuners to display device 240, and display device 240 may display the scaled image data from the six tuners. For example, display device 240 may display six sporting events being broadcast on six different TV channels.

Display device 240 may display a solid box around the image data from channel 17 indicating audio data for channel 17 will be output on the front speakers. Display device 240 may display a dashed box around the image data from channel 25 indicating audio data for channel 25 will be output on the back speakers. Accordingly, media hub device 210 may assign audio data for channel 17 to a left front audio channel and a right front audio channel, and provide the audio data for channel 17 to the left and right front speakers 250 via the left and right front audio channels. Similarly, media hub device 210 may assign audio data for channel 25 to a left back audio channel and a right back audio channel, and provide the audio data for channel 25 to the left and right back speakers 250 via the left and right back audio channels.

The user may use remote control 230 to change the TV channels that the tuners are tuned to and/or change the tuners that output audio data to speakers 250. For example, rather than providing stereo audio from two tuners to speakers 250, the user may select four tuners to output mono audio to speakers 250.

In this way, the user may watch multiple TV channels via multiple TV tuners at the same time and be provided with audio for more than one of the TV channels.

As indicated above, FIGS. 6A-6C are provided merely as an example. Other examples are possible and may differ from what was described with regard to FIGS. 6A-6C.

Implementations described herein may allow a user to view image data received from multiple tuners at a same time. Similarly, implementations described herein may allow the user to hear audio data received from multiple tuners at a same time. Accordingly, a user is not limited to only be presented image data and audio data from one tuner at any one time.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   tune a plurality of tuners to a plurality of television channels;
   receive image data and audio data for the plurality of television channels from the plurality of tuners;
   provide the image data from the plurality of tuners for display on a display device and for display at a first same time;
   assign the audio data from a group of the plurality of tuners to respective audio channels of a same stereo sound system or a same surround sound system, the group of the plurality of tuners including more than one of the plurality of tuners; and
   provide the audio data from the group of the plurality of tuners, and for at least two of the plurality of television channels, for output at the first same time via the respective audio channels of the same stereo sound system or the same surround sound system, the same stereo sound system or the same surround sound system being capable of providing different audio channel data from a same tuner, and for a same television channel, to each of the respective audio channels at a second same time.

2. The device of claim 1, where the one or more processors are further to:
   receive a request from a user to tune at least one of the plurality of tuners to a particular television channel, the particular television channel being included in the at least two of the plurality of television channels, and
   where the one or more processors, when tuning the plurality of tuners, are to tune the at least one of the plurality of tuners based on the request from the user.

3. The device of claim 1, where the one or more processors are further to:

receive a request from a client device to tune at least one of the plurality of tuners to a particular television channel,
the particular television channel being included in the at least two of the plurality of television channels;
where the one or more processors, when tuning the plurality of tuners, are to:
tune the at least one of the plurality of tuners based on the request from the client device; and
provide a network stream of the image data and the audio data for the particular television channel to the client device for presentation.

4. The device of claim 1, where the one or more processors are further to:
scale the image data from the plurality of tuners to be displayed on the display device.

5. The device of claim 1, where the one or more processors, when assigning the audio data from the group of the plurality of tuners, are to:
assign the audio data from each of the plurality of tuners to the respective audio channels.

6. The device of claim 1, where the one or more processors, when assigning the audio data from the group of the plurality of tuners, are to:
assign the audio data from fewer than all of the plurality of tuners to the respective audio channels.

7. The device of claim 1, where the one or more processors are further to:
provide an electronic program guide to the display device, the electronic program guide including an option for multiple television channel viewing;
receive a selection of the multiple television channel viewing option from a user; and
where the one or more processors, when providing the image data and providing the audio data, are to:
provide the image data from the plurality of tuners and the audio data from the group of the plurality of tuners based on the selection of the multiple television channel viewing option.

8. A computer-readable medium storing instructions, the instructions comprising:
one or more instructions that, when executed by one or more processors, cause the one or more processors to:
receive multimedia content from a plurality of sources, the multimedia content from each of the sources including image data and audio data;
provide the image data from the plurality of sources for display at a first same time;
assign the audio data from a group of the plurality of sources to respective audio channels of a same stereo sound system or a same surround sound system,
the group of the plurality of sources including more than one of the plurality of sources; and
provide the audio data from the group of the plurality of sources for output at the first same time via the respective audio channels of the same stereo sound system or the same surround sound system,
the same stereo sound system or the same surround sound system being capable of providing different audio channel data from a same source to each of the respective audio channels at a second same time.

9. The computer-readable medium of claim 8, where the one or more instructions, when executed by the one or more processors, further cause the one or more processors to:
determine a layout that the image data from the plurality of sources is to be displayed; and
where the one or more instructions, that cause the one or more processors to assign the audio data from the group of the plurality of sources, cause the one or more processors to:
assign the audio data from the group of the plurality of sources to the respective audio channels based on the layout.

10. The computer-readable medium of claim 8, where the one or more instructions, that cause the one or more processors to provide the image data from the plurality of sources for display at the first same time, cause the one or more processors to:
provide the image data in a grid layout for display.

11. The computer-readable medium of claim 8, where the one or more instructions, that cause the one or more processors to assign the audio data from the group of the plurality of sources, cause the one or more processors to:
assign first mono audio data from a first source to a left audio channel of the same stereo sound system; and
assign second mono audio data from a second source to a right audio channel of the same stereo sound system,
the plurality of sources including the first source and the second source, and
the respective audio channels including the left audio channel and the right audio channel.

12. The computer-readable medium of claim 8, where the one or more instructions, that cause the one or more processors to assign the audio data from the group of the plurality of sources, cause the one or more processors to:
assign first stereo audio data from a first source to a first audio channel and a second audio channel of the same surround sound system; and
assign second stereo audio data from a second source to a third audio channel and a fourth audio channel of the same surround sound system,
the plurality of sources including the first source and the second source, and
the respective audio channels including the first, second, third, and fourth audio channels.

13. The computer-readable medium of claim 8, where the one or more instructions, that cause the one or more processors to assign the audio data from the group of the plurality of sources, cause the one or more processors to:
assign the audio data from the group of the plurality of sources to a same audio channel.

14. The computer-readable medium of claim 8, where the one or more instructions, that cause the one or more processors to assign the audio data from the group of the plurality of sources, cause the one or more processors to:
assign the audio data from the group of the plurality of sources to the respective audio channels based on an input from a user.

15. A method, comprising:
causing, by a device, a plurality of tuners to be tuned to a plurality of television channels;
receiving, by the device, image data and audio data for the plurality of television channels from the plurality of tuners;
providing, by the device, the image data from the plurality of tuners for display on a same display device at a first same time;
selecting, by the device, audio channels, of a same stereo sound system or a same surround sound system, for the audio data from a group of the plurality of tuners,
the group of the plurality of tuners including more than one of the plurality of tuners; and providing, by the device, the audio data from the group of the plurality of tuners, and for at least two of the plurality of television channels, for output at the first same time by speakers and via the audio channels of the same stereo sound system or the same surround sound system, the same stereo sound system or the same surround sound system being capable of providing different audio channel data from a same tuner, and for a same television channel, to each of the respective audio channels at a second same time.

16. The method of claim 15, further comprising:

receiving a request from a client device to tune at least one of the plurality of tuners to a particular television channel, the particular television channel being included in the at least two of the plurality of television channels;

where causing the plurality of tuners to be tuned includes causing the plurality of tuners to be tuned based on the request from the client device;

providing a network stream of the image data and the audio data for the particular television channel to the client device for presentation; and providing the image data from the plurality of tuners includes providing the image data for the particular television channel for display on the same display device.

17. The method of claim 16, further comprising:

locking the at least one of the plurality of tuners tuned to the particular television channel based on the request from the client device to prevent a user of the device from tuning the at least one of the plurality of tuners to another television channel.

18. The method of claim 16, further comprising:

stopping the network stream from being provided to the client device based on an input by a user of the device.

19. The method of claim 15, where the audio data from each of the group of the plurality of tuners includes different kinds of audio data associated with packet identifiers, the method further comprising:

selecting a packet identifier from among the packet identifiers; and where providing the audio data from the group of the plurality of tuners includes providing a kind of audio data, of the different kinds of audio data, associated with the packet identifier.

20. The method of claim 15, further comprising:

receiving a first selection, from a user, of the plurality of television channels, receiving a second selection, from the user, of the at least two of the plurality of television channels to be output to the speakers, where causing the plurality of tuners to be tuned is based on the first selection, and where selecting the audio channels is based on the second selection.

* * * * *